(12) United States Patent
Kadarkarai

(10) Patent No.: US 9,608,941 B2
(45) Date of Patent: Mar. 28, 2017

(54) METHODS AND SYSTEMS FOR CLUSTERING EMAILS USING EMAIL ADDRESSES

(75) Inventor: Jayaprabhakar Kadarkarai, Hyderabad (IN)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/034,490

(22) Filed: Feb. 24, 2011

(65) Prior Publication Data

US 2015/0193530 A1    Jul. 9, 2015

Related U.S. Application Data

(60) Provisional application No. 61/440,071, filed on Feb. 7, 2011.

(51) Int. Cl.
*G06F 15/16* (2006.01)
*H04L 12/58* (2006.01)
*G06Q 10/10* (2012.01)

(52) U.S. Cl.
CPC ............ *H04L 51/02* (2013.01); *G06Q 10/10* (2013.01); *G06Q 10/107* (2013.01); *H04L 51/22* (2013.01)

(58) Field of Classification Search
CPC ....... G06Q 10/10; G06Q 10/107; H04L 51/02
USPC ........................................................ 709/206
See application file for complete search history.

(56) References Cited

U.S. PATENT DOCUMENTS

| | | | | |
|---|---|---|---|---|
| 2005/0165825 | A1* | 7/2005 | Turski et al. | 707/102 |
| 2007/0156732 | A1* | 7/2007 | Surendran et al. | 707/101 |
| 2008/0301250 | A1* | 12/2008 | Hardy et al. | 709/207 |
| 2010/0030798 | A1* | 2/2010 | Kumar et al. | 707/102 |

OTHER PUBLICATIONS

Manning, Introduction to Information Retrieval, Cambridge University Press, Apr. 1, 2009, Chapter 6 "Scoring, term weighting and the vector space model", pp. 109-133.
Manning, Introduction to Information Retrieval, Cambridge University Press, Apr. 1, 2009, Chapter 16 "Flat clustering", pp. 349-375.
Manning, Introduction to Information Retrieval, Cambridge University Press, Apr. 1, 2009, Chapter 17 "Hierarchical clustering", pp. 377-401.
Hamerly, Learning the k in k-means, *Advances in Neural Information Processing Systems* 16, 2004, available at http://books.nips.cc/nips16.html, downloaded Feb. 28, 2011, 21 pages.

* cited by examiner

*Primary Examiner* — Kevin Mai
(74) *Attorney, Agent, or Firm* — Morgan, Lewis & Bockius LLP

(57) ABSTRACT

A computer-implemented method of automatically organizing email messages is performed at a computer system. In the method, a plurality of email messages is accessed. A set of email addresses included in the email messages is identified, respective weights are assigned to respective email addresses in the set of email addresses, and the plurality of email messages is divided into clusters in accordance with the respective weights. Email messages of the plurality of email messages are provided for display, organized by the respective clusters.

14 Claims, 16 Drawing Sheets

Email Message 300

| From: | name1@domain1.com | 302 |
| --- | --- | --- |
| To: | name2@domain1.com; name3@domain1.com | 304 |
| cc: | group1@domain1.com | 306 |
| bcc: | name4@domain2.com | 308 |
| Reply-to: | name1@domain1.com | 310 |
| {Text} | | 312 |

Figure 3A

Set of Words 320

|     | 324 | 326 | 328 | 330 |
| --- | --- | --- | --- | --- |
| 322 | Message 1 | name1@domain1.com | From, Reply-to | Individual |
| 322 | Message 1 | name2@domain1.com | To | Individual |
| 322 | Message 1 | name3@domain1.com | To | Individual |
| 322 | Message 1 | group1@domain1.com | Cc | Group |
| 322 | Message 1 | name4@domain2.com | Bcc | Individual |
| 322 | Message 2 | name1@domain1.com | From | Individual |
|  | ⋮ | ⋮ | ⋮ | ⋮ |

Figure 3B

| Email Address Incidence Matrix 400 | Address | Address | Address | Address | Address | Address | Address | ... |
|---|---|---|---|---|---|---|---|---|
| Email 1 — Message ID | — | IDF | — | IDF | — | IDF | — | ... |
| Email 2 — Message ID | IDF | — | IDF | — | IDF | — | — | ... |
| Email 3 — Message ID | IDF | IDF | — | — | IDF | — | IDF | ... |
| Email 4 — Message ID | — | — | IDF | IDF | — | — | — | ... |
| ... | | | | | | | | |

Figure 4A

| | 404-1<br>Individual Address | 404-2<br>Individual Address | 404-3<br>Individual Address | 404-4<br>Individual Address | 404-5<br>Group Address | 404-6<br>Individual Address | |
|---|---|---|---|---|---|---|---|
| Email 1 — Message ID | — | IDF | IDF | — | Wgroup*IDF | — | ... |
| Email 2 — Message ID | IDF | — | — | IDF | — | — | ... |
| Email 3 — Message ID | IDF | — | — | IDF | — | IDF | ... |
| Email 4 — Message ID | — | IDF | IDF | — | — | — | ... |
| ... | | | | | | | |

Email Address Incidence Matrix 420

Figure 4B

Listing of Result Clusters
500

| | 504 | 506 |
|---|---|---|
| 502 | Cluster 1 | name2@domain1.com:0.5; name3@domain1.com:0.5 |
| 502 | Cluster 2 | name1@domain1.com:0.7, name4@domain2.com:0.3 |
| 502 | Cluster 3 | group1@domain1.com:0.6; name1@domain1.com:0.3, name2@domain1.com:0.1 |

Mapping of Email Messages to Clusters
520

| | 524 | 526 | 528 |
|---|---|---|---|
| 522 | Message 1 | Cluster 1 | name2@domain1.com; name3@domain1.com |
| 522 | Message 2 | Cluster 3 | group1@domain1.com; name 1@domain1.com, name2@domain1.com |
| 522 | Message 3 | Cluster 1 | name2@domain1.com; name3@domain1.com |
| 522 | Message 4 | Cluster 2 | name1@domain1.com, name4@domain2.com |
| 522 | Message 5 | Cluster 1 | name2@domain1.com; name3@domain1.com |
| 522 | Message 6 | Cluster 2 | name1@domain1.com, name4@domain2.com |

Listing of Result Clusters
540

| | 544 | 546 |
|---|---|---|
| 542 | Cluster 1-1-1 | (addresses:scores) |
| 542 | Cluster 1-1-2 | (addresses:scores) |
| 542 | Cluster 1-2 | (addresses:scores) |
| 542 | Cluster 2-1 | (addresses:scores) |
| | Cluster 2-2 | (addresses:scores) |
| | Cluster 3 | (addresses:scores) |

Mapping of Email Messages to Clusters
560

| | 564 | 566 |
|---|---|---|
| 562 | Message 1 | Cluster 1-1-1 |
| 562 | Message 2 | Cluster 3 |
| 562 | Message 3 | Cluster 1-2 |
| 562 | Message 4 | Cluster 2-2 |
| 562 | Message 5 | Cluster 1-1-1 |
| 562 | Message 6 | Cluster 2-1 |

Mapping of Email Messages to Clusters
580

| | 584 | 586-1 | 586-2 |
|---|---|---|---|
| 582 | Message 1 | Cluster 1 : 0.8 | Cluster 2 : 0.2 |
| 582 | Message 2 | Cluster 2 : 1.0 | |
| 582 | Message 3 | Cluster 2 : 0.6 | Cluster 3 : 0.4 |

METHODS AND SYSTEMS FOR CLUSTERING EMAILS USING EMAIL ADDRESSES

RELATED APPLICATION

This application claims priority to U.S. Provisional Patent Application No. 61/440,071, titled "Methods and Systems for Clustering Emails Using Email Addresses," filed Feb. 7, 2011, which is hereby incorporated by reference in its entirety.

TECHNICAL FIELD

The disclosed embodiments relate generally to organizing documents, and more particularly, to organizing email messages.

BACKGROUND

Increases in storage capacity make it unnecessary to delete emails. Organizing the resulting large volume of email messages, however, presents significant challenges. For example, users or custodians may not be willing to make the effort to store their emails in different folders. Leaving emails in a single folder, however, may result in a frustrating user experience. In another example, an authorized person may desire to group or otherwise organize emails from multiple users or custodians. Accordingly, there is a need for ways to organize emails efficiently.

SUMMARY

In some embodiments, a computer-implemented method of automatically organizing email messages is performed at a computer system. In the method, a plurality of email messages is accessed. A set of email addresses included in the email messages is identified, respective weights are assigned to respective email addresses in the set of email addresses, and the plurality of email messages is divided into clusters in accordance with the email addresses in those email messages and the respective weights. Email messages of the plurality of email messages are provided for display, organized by the respective clusters.

In some embodiments, a system for automatically organizing email messages includes one or more processors and memory storing one or more programs configured for execution by the one or more processors. The one or more programs include: instructions to access a plurality of email messages, instructions to identify a set of email addresses included in the email messages, instructions to assign respective weights to respective email addresses in the set of email addresses, instructions to divide the plurality of email messages into clusters in accordance with the respective weights, and instructions to provide email messages of the plurality for display, organized by the respective clusters.

In some embodiments, a computer-readable storage medium stores one or more programs configured to be executed by a computer system to organize email messages automatically. The one or more programs include: instructions to access a plurality of email messages, instructions to identify a set of email addresses included in the email messages, instructions to assign respective weights to respective email addresses in the set of email addresses, instructions to divide the plurality of email messages into clusters in accordance with the respective weights, and instructions to provide email messages of the plurality for display, organized by the respective clusters.

BRIEF DESCRIPTION OF THE DRAWINGS

FIGS. 3A and 3C illustrate email messages with email addresses in multiple fields.

FIGS. 3B and 3D illustrate a set-of-words data structure for storing a list of email addresses in accordance with some embodiments.

FIGS. 4A and 4B illustrate an email address incidence matrix in accordance with some embodiments.

FIGS. 5A and 5C illustrate listings of clusters in accordance with some embodiments.

FIGS. 5B, 5D, and 5E illustrate mappings of email messages to clusters in accordance with some embodiments.

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1:
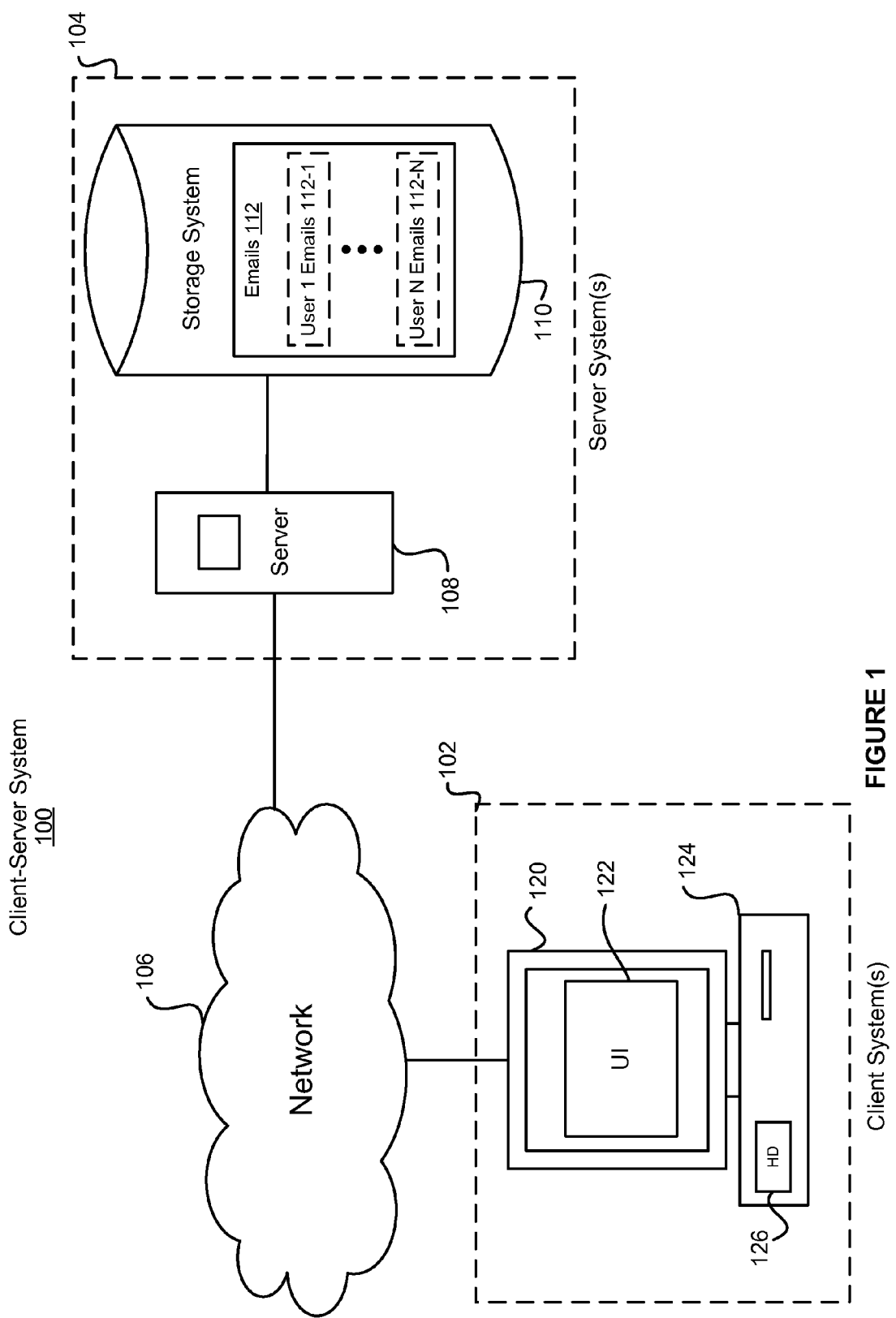
FIG. 1 is a block diagram illustrating a client-server system in accordance with some embodiments.

FIG. 1 is a block diagram illustrating a client-server system 100 in accordance with some embodiments. Client-server system 100 includes a server system 104 coupled to client systems 102 by a network 106. The network 106 is any suitable wired and/or wireless network and may include a local area network (LAN), wide area network (WAN), virtual private network (VPN), the Internet, metropolitan area network (MAN), or any combination of such networks.

Server system 104 includes a server 108 and a storage system (e.g., database) 110. Server 108 serves as a front-end for server system 104 and provides an interface between server system 104 and client systems 102. In some embodiments, the functions of server 108 may be divided or allocated among two or more servers. It should be appreciated that server system 104, including server 108 and storage system 110, may be implemented as a distributed system of multiple computers and storage devices. However, for convenience of explanation, the server system 104 is described herein as being implemented on a single computer system (e.g., a server system 700, FIG. 7), which can be considered a single logical system.

Storage system 110 stores email messages 112 for a plurality of users. For example, a first set of email messages 112-1 for a first user is associated with an email account for the first user, and an Nth set of email messages 112-N for an Nth user, where N is an integer greater than one, is associated with an email account for the Nth user. Respective users have respective email addresses associated with their accounts and thus with respective sets of email messages. A set of email messages for a given user can include as many as hundreds of thousands, or even millions, of email messages.

A user interfaces with the server system 104 at a client system or device 102 (hereinafter called client system 102 for ease of reference). Client system 102 includes a computer 124 or computer-controlled device, such as a personal digital assistant (PDA), cellular telephone or the like. Computer 124 typically includes one or more processors (not shown); memory, which may include volatile memory (not shown) and non-volatile memory such as a hard disk drive 126; and a display 120. The computer 124 may also have input devices such as a keyboard and a mouse (not shown). A user may interact with the server system 104 via a user interface 122 (e.g., the user interface of a web browser) presented on the display 120. For example, the first user may log into his email account via user interface 122 and thereby access the email messages 112-1 stored in storage system 110.

A user may desire to group related emails into clusters, for ease of viewing, particularly given the large number of potential emails stored in storage system 110. In some embodiments, email messages are automatically clustered based on their associated email addresses. Clustering email messages based on email addresses is effective because the email addresses for a message provide a potential indication of the subject matter of the message. For example, email messages between two co-workers who work on multiple projects together and also have shared interests could be related to any of the projects or shared interests. Messages that include the two co-workers and a third co-worker who only works on a particular project of the multiple projects and who does not share the interests of the first two co-workers are likely related to the particular project. Messages that include the two co-workers and a fourth co-worker who does not work on any projects with the two co-workers and shares a single interest with the two co-workers are likely related to the single shared interest.

Figure 2A:
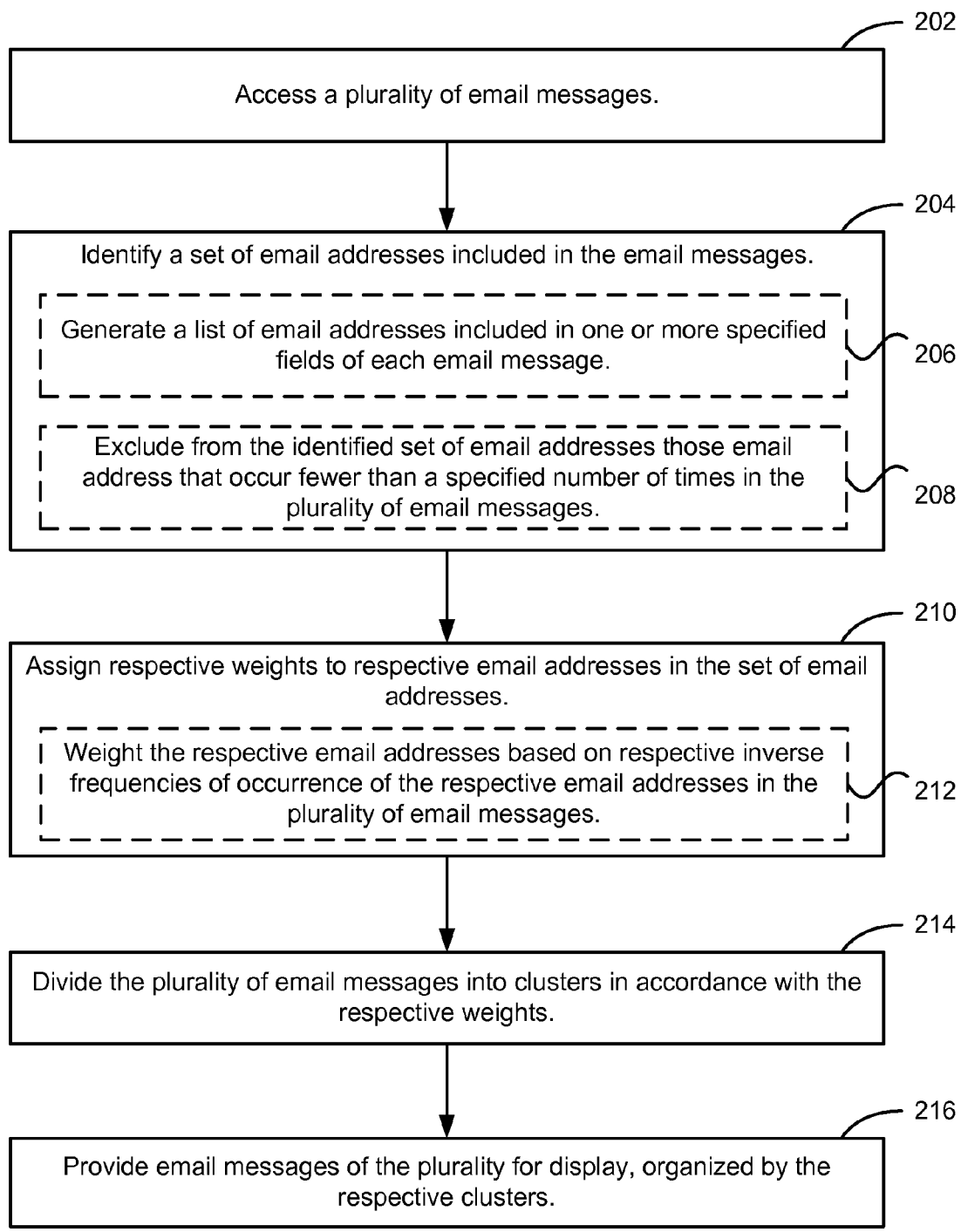
FIGS. 2A-2C are flow diagrams illustrating a method of automatically organizing emails using clustering based on email addresses in accordance with some embodiments.
Figure 7:
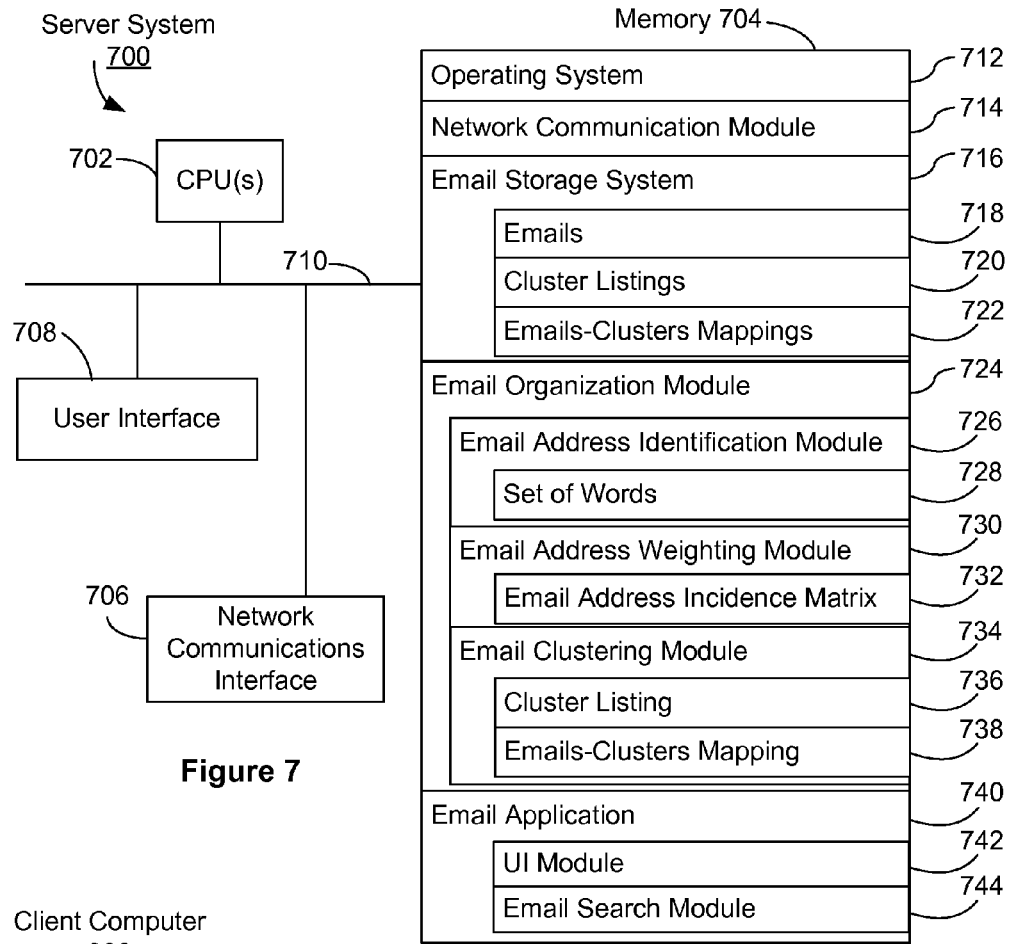
FIG. 7 is a block diagram illustrating a server computer in accordance with some embodiments.

FIG. 2A is a flow diagram illustrating a method 200 of automatically organizing emails using clustering based on email addresses in accordance with some embodiments. In some embodiments, method 200 is performed at (and by) a server system 104 (FIG. 1), an example of which is the server system 700 (FIG. 7). Alternatively, method 200 is performed by a stand-alone computing device that stores email messages. For example, method 200 could be performed at the client system 102 (FIG. 1) to cluster email messages stored in the hard drive 126 or elsewhere in the memory of the client system 102.

In method 200, a plurality of email messages are accessed (202). In some embodiments, the plurality of email messages is associated with a single user account. For example, the plurality of email messages is the set of email messages 112-1 (FIG. 1) associated with a first user, or a subset of the set of email messages 112-1. Examples of such a subset include email messages in a folder or group of folders in the first user's account, or email messages in the first user's account that are identified in response to a search query. Messages identified in response to a search query are messages matching the search query, or messages satisfying the search query. In other embodiments, the plurality of email messages is associated with a plurality of user's accounts. For example, the plurality of email messages includes the first set of email messages 112-1 associated with the first user and the Nth set of email messages 112-N associated with the Nth user. In another example, the plurality of email messages includes a subset of email messages from the account of each of a plurality of users; in some embodiments these subsets are identified in response to a search query. In yet another example, the plurality of email messages includes all email messages in the storage system 110, or all email messages in the storage system 110 that match or satisfy a query.

A set of email addresses included in the email messages is identified (204). In some embodiments, the identified email addresses are included in one or more specified fields in the email messages accessed during the operation 202. FIG. 3A illustrates an email message 300 with email addresses in multiple fields: a "from" field 302 provides the email address of the sender, a "to" field 304 provides email addresses of recipients, a "cc" field 306 provides email addresses of those being copied, a "bcc" field 308 provides email addresses of those being blind-copied, and a "reply-to" field 310 provides the email address to which replies to the email message 300 will be sent. In some embodiments, email addresses identified during the operation 204 come from all or a portion (e.g., two or more) of fields 302, 304, 306, 308, and 310. In one example, the identified email addresses come from the "from," "to," and "cc" fields 302, 304, and 306. In another example, the identified email addresses come from these three fields and also from the "bcc" and "reply-to" fields 308 and 310, and thus come from all of fields 302-310. Other examples are possible. The email message 300 also includes text 312 and/or other content (e.g., graphics or attachments), which are not analyzed when clustering email messages based on email addresses and thus not used in method 200.

Email addresses in fields 302-310 may include both individual and group email addresses. For example, the "name1" address in the "from" field 302 is an individual address associated with a user whose username is "name1." The "group1" address in the "cc" field 306 is a group address associated with a group of users; inclusion of the "group1" address in the "cc" field 306 indicates that the message 300 was copied to all users in group1. In some embodiments, group email addresses are identified by querying a list of group email addresses stored in the storage system 110.

In some embodiments, a list is generated (206) of the email addresses included in the one or more specified fields of each email message of the plurality of email messages accessed in the operation 202. For example, FIG. 3B illustrates a set-of-words data structure 320 that includes a list of email addresses in accordance with some embodiments. The data structure 320 includes rows 322, each of which corresponds to an email address identified in the operation 204. A column 326 stores email addresses and a column 324 stores message identifiers for the messages in which respective email addresses are found and thus identified. The column 326 thus provides the generated list of email addresses. In some embodiments, the data structure 320 also includes a column 328 that stores the fields (e.g., the fields 302-310, FIG. 3A) in which respective addresses are found and a column 330 that provides indications of whether respective email addresses are individual or group email addresses.

In the example of FIG. 3B, the set-of-words data structure 320 includes entries for each of the email addresses in the email message 300 (FIG. 3A), thus indicating that the one or more specified fields from which email addresses were identified in the operation 204 includes all of fields 302-310. (The email message 300 of FIG. 3A is referred to as "Message 1" in the column 324 of the data structure 320.) If a field were excluded from the one or more specified fields, then addresses in the excluded field would not be listed in column 326 of the data structure 320, assuming that the addresses were not found in other fields included in the one or more specified fields. For example, if the "bcc" field 308 and "reply-to" field 310 were excluded from the one or more specified fields, then the "name4" address would not be included in column 326. The "name1" address would still be included in column 326, however, because the "name1" address is also found in the "from" field 302 of the email message 300.

The data structure 320 corresponds to a set of words, with the words in this context being email addresses, because each email address is only listed once per message, regardless of how many times the email address appears in fields 302-310 of the message. For example, the "name1" address appears twice in the email message 300: once in the "from" field 302 and once in the "reply-to" field 310. However, "name1" only appears once for "Message 1" in the data structure 320. A set of words, such as the list of email addresses in column 326, is distinguishable from a "bag of words" because it does not count multiple occurrences of a word (e.g., of an email address) in a document (e.g., in an email message). In some embodiments, however, separate occurrences of the same email address in separate fields are considered to be separate words and have separate corresponding rows in the data structure 320. For example, the data structure 320 could have separate rows for "name1" in the "from" field 302 and the "reply-to" field 310.

Figure 3C:
Figure 3D:

In some embodiments, an email address includes a suffix that is used for descriptive purposes and does not affect the function of the email address. The suffix is preceded by an indicator (e.g., a predefined character) that indicates that the following characters are to be ignored. For example, FIG. 3C illustrates an email message 340 that includes the email address "name2+tag" at domain1 dot com in the "to" field 304. In this email address, the "tag" portion of "name2+tag" is a suffix that is ignored for purposes of mail delivery, and the "+" symbol is the indicator preceding the suffix. This address thus is equivalent to "name2" at domain1 dot com for purposes of mail delivery. A user can append different tags to his email address in different contexts and then can organize his emails based on the tags, for example by setting up filters based on the tags. In some embodiments, generating (206) the list of email addresses includes truncating addresses to remove any suffixes. This truncation is performed, for example, using a text stemming procedure. For example, FIG. 3D illustrates a set-of-words data structure 360 for email addresses in email messages including the message 340 (FIG. 3C), which is referred to as "Message 1" in column 324 of the data structure 360. As FIG. 3D shows, the email address "name2+tag" at domain1 dot com in the "to" field 304 of the email message 340 has been truncated to "name2" at domain1 dot com in the corresponding entry in column 326 of the set-of-words data structure 360.

An email address can include two or more terms, separated, for example, by hyphens (e.g., "term1-term2" at domain dot com). For example, a group email address has a first term specifying a general group and a second term specifying a sub-group, as shown for the address "group1-subgroupA" at domain1 dot com in the "cc" field 306 of the email message 340 (FIG. 3C). In some embodiments, each term is treated as a separate address and thus is listed separately in the list of email messages generated during the operation 206. In some embodiments, each term is listed separately and the combination of the terms also is listed. For example, the address "group1-subgroupA" at domain1 dot com in the "cc" field 306 of the email message 340 results in three different entries in the set-of-words data structure 360: "group1-subgroupA" at domain1 dot com, "group1" at domain1 dot com, and "subgroupA" at domain1 dot com. Subsequent clustering based on the email addresses listed in column 326 thus will treat the terms as separate email addresses.

In some embodiments, a first email address has a first term and a second term (e.g., "group1-subgroupA" at domain1 dot com), and a second email address has the first term and a third term (e.g., "group1-subgroupB" at domain1 dot com). Each term (e.g., "group1," "subgroupA," and "subgroupB" is treated as a separate email address and thus is listed separately, in addition to or instead of listing the first and second email addresses.

In some embodiments, email addresses that occur fewer than a specified number of times in the plurality of email messages are excluded (208) from the identified set of email addresses. For example, if the accessed plurality of email messages includes tens or hundreds of thousands of emails, email addresses that occur in fewer than several hundred (e.g., 200 or 500) or several thousand (e.g., 1000 or 2000) email messages are excluded from the identified set of email addresses. Excluded email addresses are not listed in the column 326 of the data structure 320 (FIG. 3B) or 360 (FIG. 3D) and are not used in subsequent clustering.

Respective weights are assigned (210) to respective email addresses in the set of email addresses identified in the operation 204. In some embodiments, the respective email addresses are weighted (212) based on respective inverse frequencies of occurrence of the respective email addresses in the plurality of email messages. For example, the Inverse Document Frequency (IDF), which is an example of a metric based on the inverse frequency of occurrence of an email address in the plurality of email messages, is used to weight the email addresses. The IDF of a respective email address is calculated by dividing the total number of email messages accessed in the operation 202 by the number of those email messages that contain the respective email address in the one or more specified fields (e.g., fields 302-310, FIGS. 3A&3C, or a subset thereof), and taking the logarithm of the resulting quotient.

In some embodiments, assigning the respective weights to respective email addresses includes generating an email address incidence matrix. FIG. 4A illustrates an email address incidence matrix 400 in which email addresses are weighted by their IDF values in accordance with some embodiments. Each row 402 of the matrix 400 corresponds to a distinct message in column 324 of the set-of-words data structure 320 (FIG. 3B) or 360 (FIG. 3D). Each column 404 corresponds to a distinct email address listed in column 326 of the set-of-words data structure 320 or 360. (Alternatively, each row corresponds to a distinct email address and each column corresponds to a distinct message, resulting in a matrix that is the transpose of the matrix 400.) If an email address listed in column 326 is found in the one or more specified fields of a message, then the IDF value of that email address is stored in the entry in the matrix 400 at the intersection of the row 402 corresponding to the message and the column 404 corresponding to the address. If the email address is not found in the one or more specified fields of the message, however, then the corresponding entry is empty (or alternatively stores a zero).

In some embodiments, the respective email addresses are further weighted based on whether they are group or individual email addresses. For example, a first weighting factor is applied to group email addresses and a second weighting factor is applied to individual email addresses. In some embodiments, the first weighting factor for the group addresses is greater than, or greater than or equal to, the second weighting factor for the individual addresses. The first weighting factor being greater than the second weighting factor reflects a tendency of group addresses to provide a stronger indication of the subject of an email than individual addresses. FIG. 4B illustrates an email address incidence matrix 420 in which email addresses (e.g., addresses listed in the column 326 of the set-of-words data structure 320 or 360, FIGS. 3B & 3D) are weighted based on both their IDF values and whether they are group or individual addresses. In the example of the matrix 420, the columns 404-1 through 404-4 and 404-6 correspond to individual addresses, and the column 404-5 corresponds to a group address. The group address of column 404-5 is weighted by the product of its IDF value and a group address weighting factor $W_{group}$, while the individual addresses of columns 404-1 through 404-4 and 404-6 are weighted by their IDF values. In this example, the first weighting factor equals $W_{group}$ and the second weighting factor equals one. In some embodiments, $W_{group}$ is greater than or equal to one. While FIG. 4B shows addresses weighted by the product of the weighting factor based on inverse frequency of occurrence and the weighting factor based on address type, in some embodiments the addresses are weighted by the sum of these weighting factors. In some embodiments, the addresses are weighted by yet another mathematical combination of these weighting factors.

In some embodiments, the respective email addresses are further weighted based on the fields (e.g., the fields 302-310, FIGS. 3A & 3C) in which they are found. For example, each field has a distinct associated weighting factor. In one example, addresses found in the "from" field 302 and the "to" field 304 are weighted higher than addresses found in the "cc" field 306, which in turn are weighted higher than addresses found in the "bcc" field 308. Other examples are possible. In these embodiments, occurrences of the same email address in different fields are treated as different words and are listed separately in the set of words data structure 320 or 360 (FIGS. 3B & 3D). Weighting factors associated with fields are multiplied by or added to other weighting factors (e.g., IDF values and/or weighting factors based on address type).

The plurality of email messages is divided (214) into clusters in accordance with the respective weights. Dividing the email messages into clusters is also referred to as clustering the email messages. This division is performed by applying a clustering algorithm to the data in the matrix 400 or 420 (FIGS. 4A-4B). In some embodiments, the clustering algorithm is a flat clustering algorithm, in which a set of clusters is created without any relationship between the clusters. Alternatively, the clustering algorithm is a hierarchical algorithm that creates a hierarchy of clusters. In some embodiments, the clustering algorithm is a hard clustering algorithm that assigns each email message to only one cluster. Alternatively, the clustering algorithm is a soft clustering algorithm, in which respective email messages are assigned fractional membership in multiple clusters. In some embodiments, the clustering algorithm does not assign every email message to a cluster; instead, some messages are unassigned and thus are not included in any cluster. Examples of clustering algorithms to be used in the operation 214 include K-Means clustering, which is a flat, hard clustering algorithm; Expectation Maximization, which is a flat, soft clustering algorithm; and Hierarchical Agglomerative Clustering, which are hierarchical algorithms. Hierarchical Agglomerative Clustering algorithms may use different measures of similarity, including single-link, complete-link, group-average, and centroid similarity.

In some embodiments, the number of clusters into which the plurality of email messages is divided (214) is predefined. For example, the number of clusters is specified in the command or instruction that initiates the process 200. Alternatively, the clustering algorithm determines the number of clusters into which the plurality of email messages is divided, for example by analyzing the data in the email address incidence matrix 400 or 420 (FIGS. 4A-4B). Because the matrices 400 and 420 store weights for respective email addresses, the clustering algorithm thus determines the number of clusters in accordance with the weights. An example of an algorithm to be used in the operation 214 that determines the number of clusters is G-Means clustering.

In some embodiments, the incidence matrix storing the weights assigned to respective email addresses is converted into a plurality of vectors, each corresponding to a respective email message, and the plurality of vectors is provided as input to the clustering algorithm. Thus, in the examples of incidence matrices 400 and 420 (FIGS. 4A-4B), each row 402 becomes a separate vector to be provided as input to the clustering algorithm. Alternatively, if the rows of the incidence matrix correspond to email addresses and the columns to email messages (e.g., the incidence matrix is the transpose of the matrix 400 or 420), then each column becomes a separate vector to be provided as input to the clustering algorithm.

In some embodiments, each cluster is associated with a set of one or more email addresses. For example, the address(es) in each set correspond to a centroid of the associated cluster. FIG. 5A illustrates a listing 500 of clusters and their associated sets of email addresses in accordance with some embodiments. Each row 502 in the listing 500 includes an entry in a column 504 that stores a cluster identifier and an entry in a column 506 that stores the associated set of email addresses. The listing 500 thus provides a mapping of the clusters to their associated sets of email addresses. The clusters in the listing 500 are an example of flat clustering, since they are not hierarchically arranged.

In some embodiments, the entries in the column 506 also store scores associated with respective email addresses, as assigned by the clustering algorithm. Cluster 1 thus is associated with the addresses "name2" at domain1 dot com and "name 3" at domain1 dot com, each of which has a score of 0.5. For example, in a respective row 502 the scores in the entry in the column 506 specify a centroid of the cluster identified in the entry in the column 504, with each email address in the entry in the column 506 corresponding to an axis and the score for that email address corresponding to a location on the axis. The centroids are used to assign messages to respective clusters. For example, the email addresses for each message are assigned values (e.g., equal values for each address, with the values for all addresses for a message summing to one). Each message thus corresponds to a point, with each value corresponding to a coordinate of the point on the axis for the corresponding address. The clustering algorithm (e.g., a K-Means algorithm) finds the centroid to which the point is closest and assigns the message to the corresponding cluster.

Whereas FIG. 5A illustrates a listing 500 of flat clusters, FIG. 5C illustrates a listing 540 of hierarchical clusters in accordance with some embodiments. Each row 542 in the listing 540 includes an entry in a column 544 that stores an identifier of a "leaf cluster," to which the clustering algorithm may assign messages, and an entry in a column 546 that stores the associated set of email addresses and corresponding scores for the leaf cluster, by analogy to column 506 (FIG. 5A). The leaf clusters shown in FIG. 5C correspond to the following hierarchy:

Cluster 1
    Cluster 1-1
        Cluster 1-1-1
        Cluster 1-1-2
    Cluster 1-2
Cluster 2
    Cluster 2-1
    Cluster 2-2
Cluster 3

Leaf clusters are the clusters at the end of branches of the hierarchy. In this example, the leaf clusters are clusters 1-1-1, 1-1-2, 1-2, 2-1, 2-2, and 3. Messages are assigned to leaf clusters and not to higher-level clusters.

FIGS. 5B and 5D illustrate mappings 520 and 560 of email messages to clusters in accordance with some embodiments. These mappings are examples of the result of the division of the plurality of email messages into clusters in operation 214. Each row 522/562 in the mapping 520/560 corresponds to an email message and includes an entry in a column 524/564 that stores a message identifier and an entry in a column 526/566 that stores a cluster identifier corresponding to the cluster to which the message was assigned. Optionally, each row 522 (or 562) includes an entry in a column 528 (or a corresponding column not shown in FIG. 5D) that stores the email address(es) associated with the cluster, as provided in the listing 500 (FIG. 5A) or 540 (FIG. 5B). In the example of FIG. 5B, each message has been assigned to a single flat cluster, indicating that a flat, hard clustering algorithm (e.g., the K-Means algorithm) was used. In the example of FIG. 5D, each message has been assigned to a single hierarchical leaf cluster, indicating that a hierarchical algorithm (e.g., an Hierarchical Agglomerative Clustering algorithm) was used. In some embodiments in which a hierarchical algorithm is used, the mapping includes multiple columns 526 for storing higher-level clusters as well as the leaf clusters, or alternatively includes multiple rows for respective messages, with each row specifying a cluster at a particular level in the hierarchy.

FIG. 5E illustrates a mapping 580 of email messages to clusters in accordance with some embodiments that use soft clustering. Each row 582 in the mapping 580 corresponds to an email message and includes an entry in a column 584 that stores a message identifier and one or more entries in columns 582 (e.g., 582-1 and 582-2) that store cluster identifiers corresponding to the one or more clusters to which the message was assigned, along with scores indicating the degree to which the message belongs to each assigned cluster. For example, as shown in FIG. 5E, message 1 is 80% part of cluster 1 and 20% part of cluster 2, as indicated by the respective scores of 0.8 and 0.2. Message 2 is 100% part of cluster 2, as indicated by the score of 1.0, and message 3 is 60% part of cluster 2 and 40% part of cluster 3, as indicated by the respective scores of 0.6 and 0.4. The mapping 580 thus includes multiple columns 586 for storing respective multiple clusters associated with a respective email message. Alternatively, a mapping of email messages to clusters for soft clustering includes multiple rows for a respective email message, each to map the message to one of the clusters associated with the message.

Email messages of the plurality of email messages are provided (216) for display, organized by the respective clusters. For example, the email messages are transmitted from a server (e.g., a server system 104, FIG. 1) to a client (e.g., a client system 102, FIG. 1) for display in a user interface.

Figure 2B:
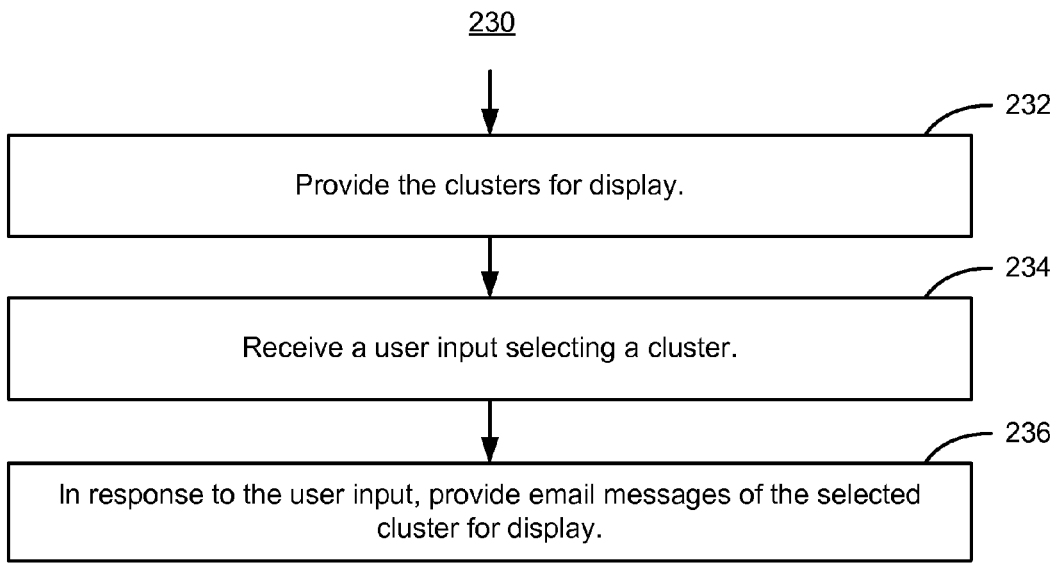
Figure 6A:
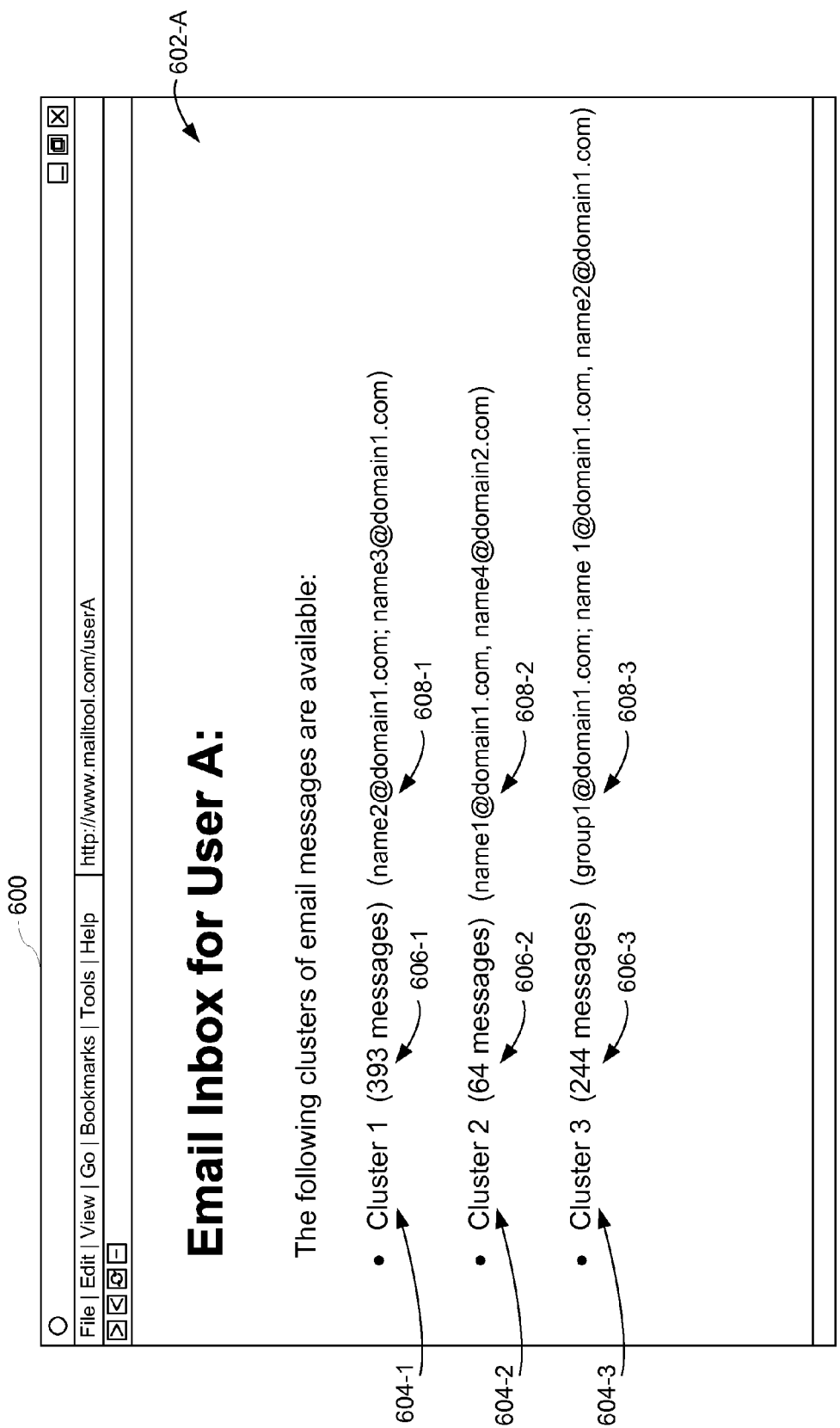
FIGS. 6A-6E are schematic screenshots of a user interface in an email application in accordance with some embodiments.
Figure 6B:
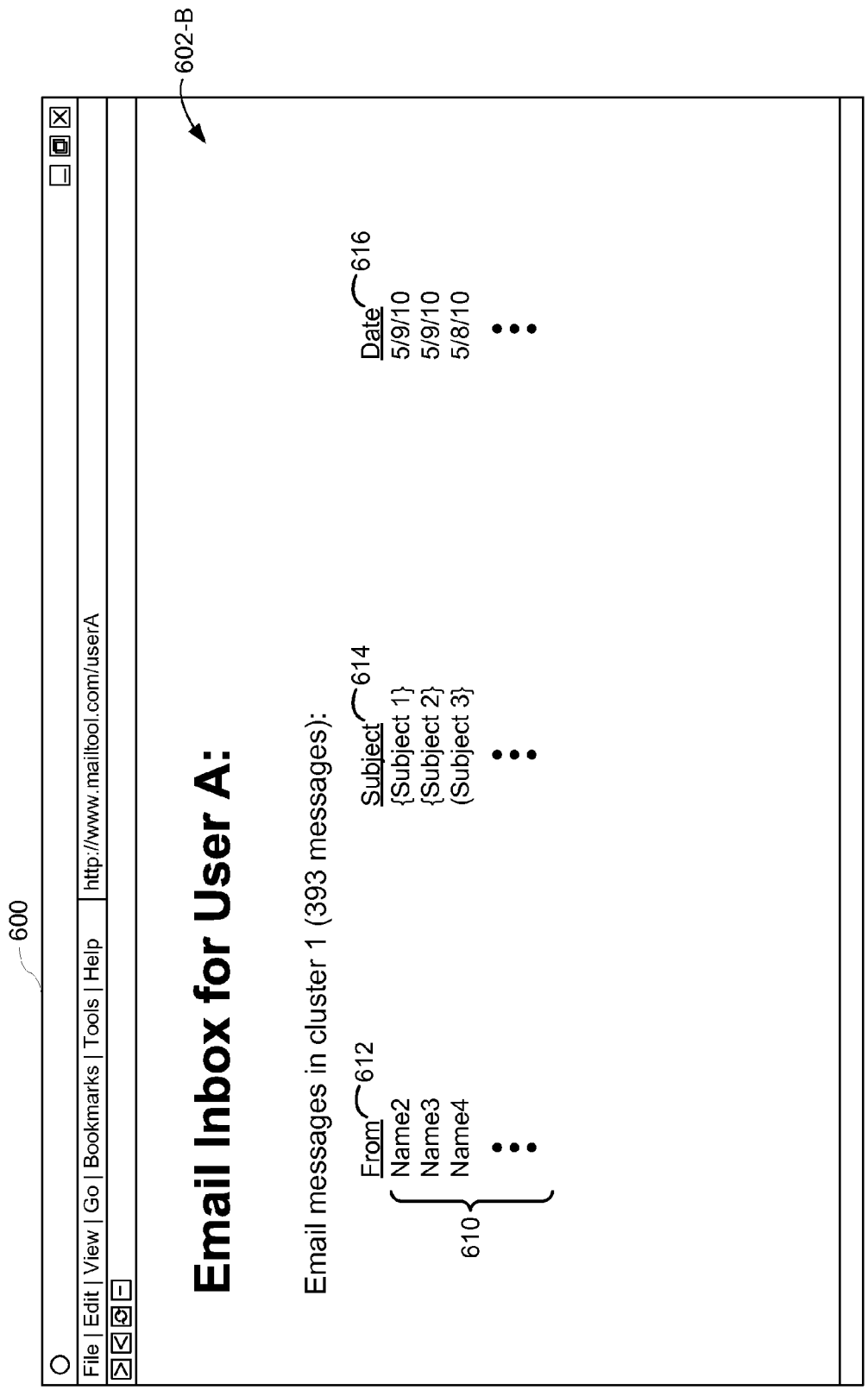
Figure 6C:
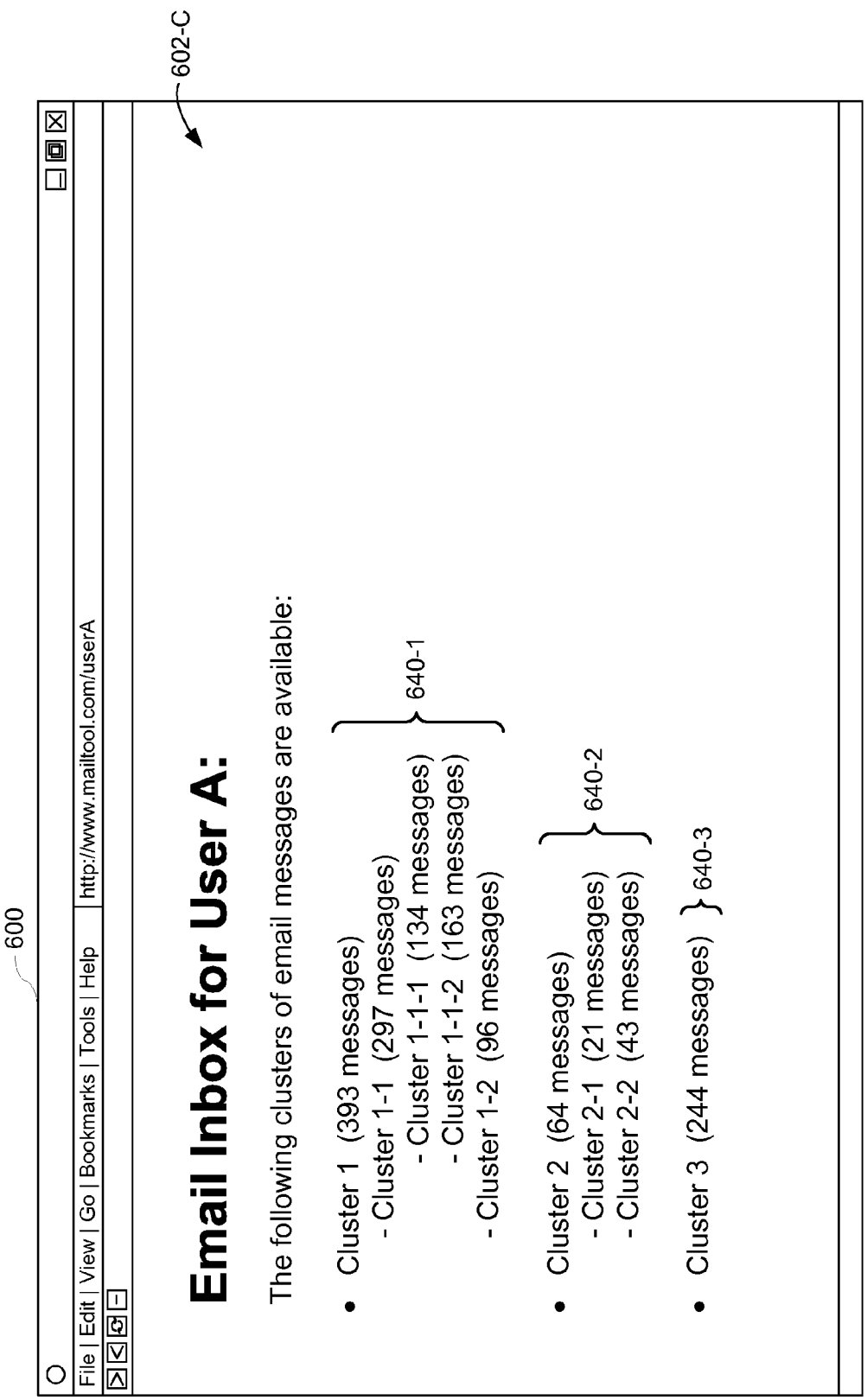

FIG. 2B is a flow diagram of a method 230 of providing (216) email messages for display organized by the respective clusters, in accordance with some embodiments. In method 230, the clusters are provided (232) for display. For example, FIG. 6A is a schematic screenshot of a user interface (UI) 602-A in an application 600 (e.g., an email application, or a web browser accessing an email application) that lists flat clusters 604-1, 604-2, and 604-3. In some embodiments, the clusters are associated with respective subsets of the set of email addresses, and a list of the respective subsets associated with the clusters is provided. For example, in the UI 602-A, sets of email addresses 608-1, 608-2, and 608-3 are listed along with the clusters 604-1, 604-2, and 604-3. In some embodiments, indicators 606-1, 606-2, and 606-3 of the number of messages in each cluster are also provided. In another example, FIG. 6C is a schematic screenshot of a user interface (UI) 602-C in an application 600 that lists hierarchical clusters 640-1, 640-2, and 640-3 along with indications of the number of messages in each cluster.

A user input is received (234) selecting a cluster. For example, the user clicks on the cluster 604-1 (FIG. 6A) or on "Cluster 1" in the hierarchical clusters 640-1 (FIG. 6C). In response to the user input, email messages of the selected cluster are provided (236) for display. For example, in response to clicking on the cluster 604-1 or on "Cluster 1" in the hierarchical clusters 640-1, a UI 602-B (FIG. 6B) is displayed, which includes a list 610 of email messages in Cluster 1. The list 610 includes, for example, the sender 612, subject 614, and date or timestamp 616 of each email in the cluster 604-1.

In the example of the hierarchical clusters 640-1, 640-2, and 640-3, the user can select a cluster at any level in the hierarchy. For example, if the user selects "Cluster 1," a list of all 393 messages in cluster 1 will be displayed, including all of the messages in each of the three leaf clusters for cluster 1. If the user selects "Cluster 1-1," a list of all 297 messages in cluster 1-1 will be displayed, including all of the messages for both leaf clusters for cluster 1-1. If the user selects "Cluster 1-1-1," a list of all 134 messages in cluster 1-1-1 will be displayed.

Figure 2C:
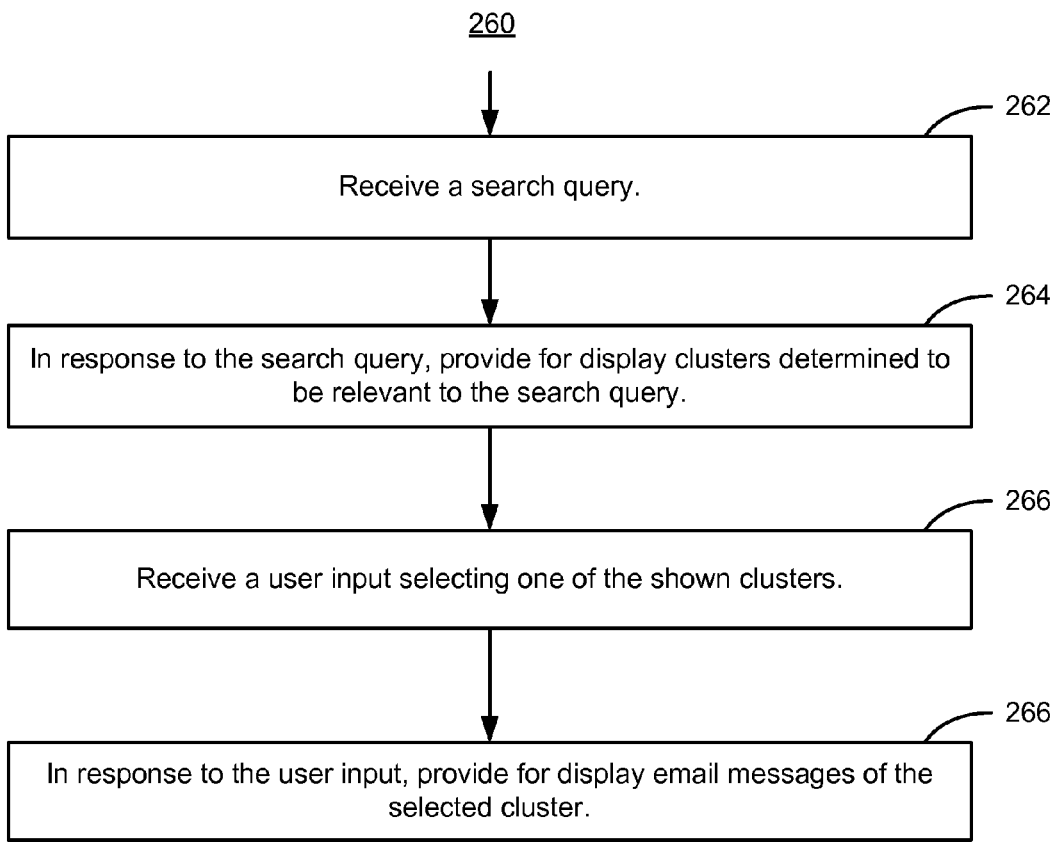
Figure 6D:
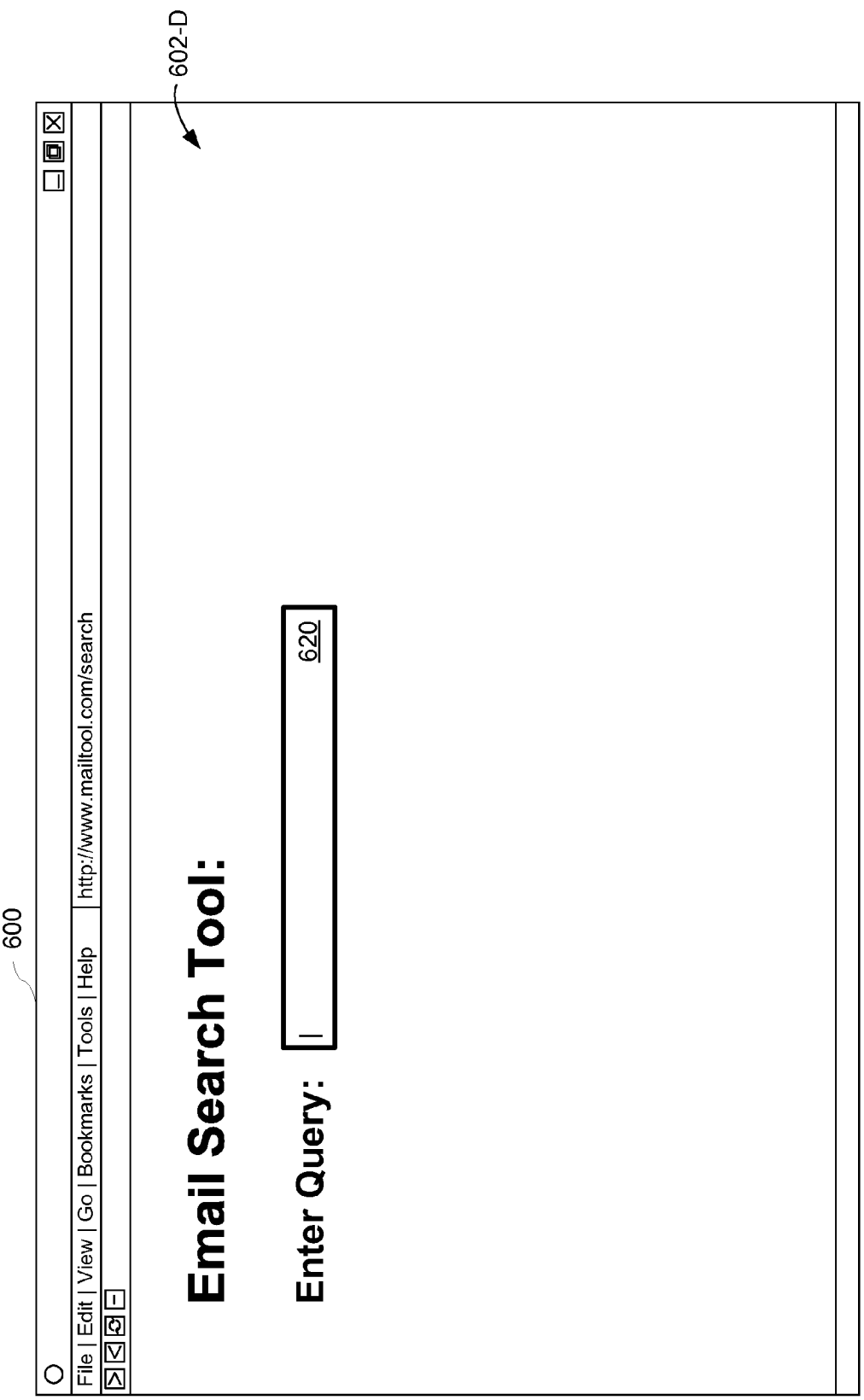
Figure 6E:
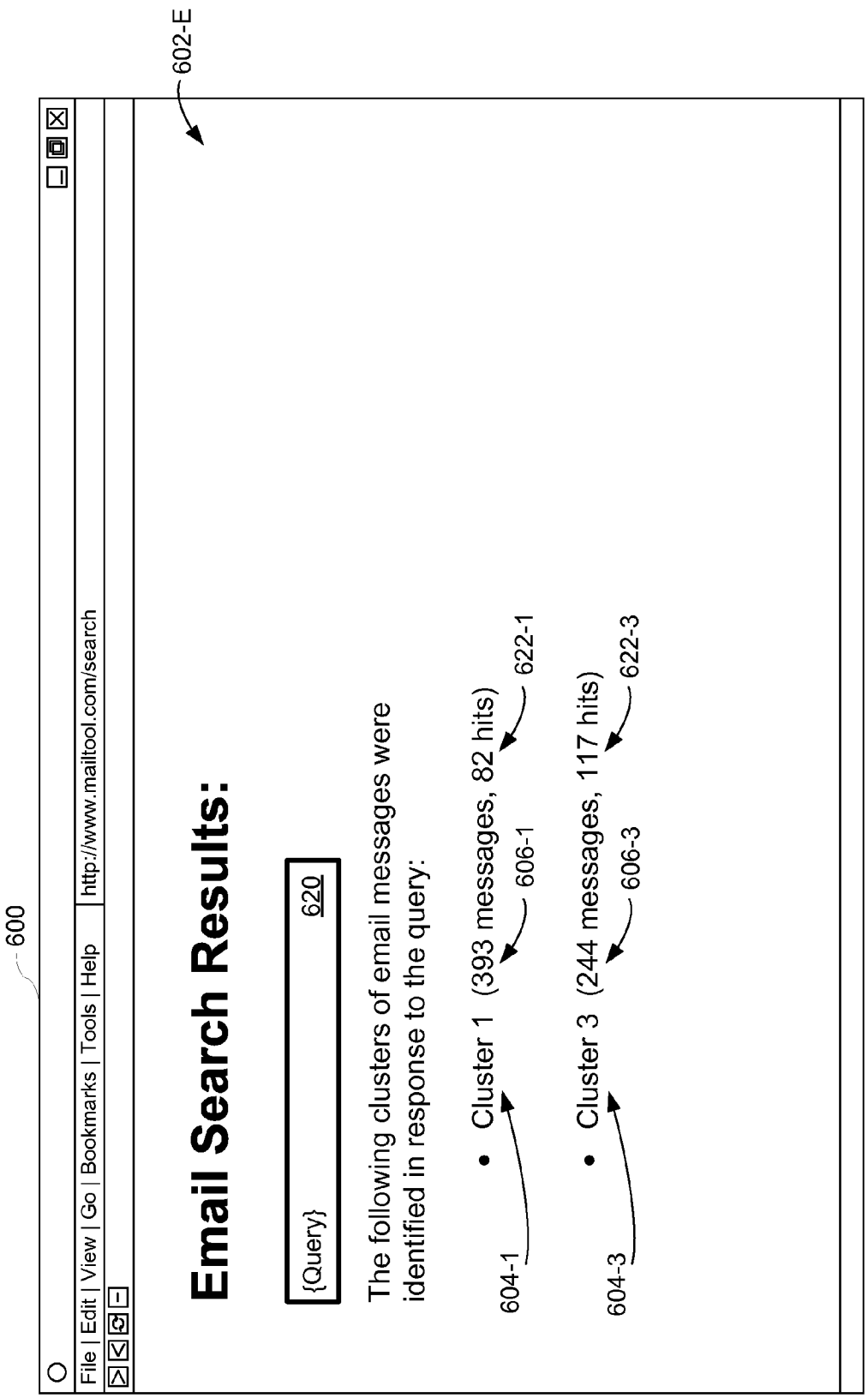

FIG. 2C is a flow diagram of an alternative method 260 of providing (216) email messages for display organized by the respective clusters, in accordance with some embodiments. In method 260, a search query is received (262). For example, a user enters a search query in a text entry box 620 in a UI 602-D, as shown in FIG. 6D in accordance with some embodiments. In response to the search query, clusters determined to be relevant to the search query are provided (264) for display. For example, in response to the search query entered in the text entry box 620, clusters 604-1 and 604-3 are determined to be relevant to the query and are displayed in a UI 602-E, as shown in FIG. 6E in accordance with some embodiments. In some embodiments, the UI 602-E also includes indicators 606-1 and 606-3 of the number of messages in each cluster and indicators 622-1 and 622-3 of the number of message determined to be relevant to the query. The clusters displayed in response to the search query may be either flat or hierarchical and either hard or soft. In some embodiments, a cluster is determined to be relevant to a query if at least a predetermined number or percentage of messages in the cluster are determined to be relevant to the query and thus are identified in response to the query. In some embodiments, a cluster is determined to be relevant to a query if at least one message in the cluster is determined to be relevant to the query. In some embodiments, a cluster is determined to be relevant to a query if the percentage of messages in the cluster determined to be relevant to the query is greater than a threshold, where the threshold is based on one or more statistical parameters with respect to the number of relevant messages in each respective cluster of the set of clusters (e.g., in a system having six or more clusters, all clusters having a number of relevant messages equal to at least the average number of relevant messages less a predefined number (e.g., 1, 1.5 or 2) of standard deviations (e.g., at least A−2σ relevant messages, wherein A is the average and σ is the standard deviation) are identified in response to the query.

A user input is received (266) selecting one or more of the shown clusters. In response to the user input, and in accordance with the user-selected cluster(s), email messages of the selected cluster are provided for display. For example, in response to clicking on the cluster 604-1 (FIG. 6E), the UI 602-B (FIG. 6B) is displayed.

In some embodiments, method 200 (FIG. 2A) is performed in response to receiving a search query: a search query is received, in response to which the plurality of email messages is accessed (202). In some embodiments, the search query is applied to a single user account or a folder within the single user account, and the plurality of email messages in operation 202 thus is associated with the single user account. Alternatively, the search query is applied to a plurality of user accounts and the plurality of email messages accessed in operation 202 is associated with the plurality of user accounts.

While method 200 (and, in some embodiments, the associated method 230 or 260, FIGS. 2B-2C) includes a number of operations that appear to occur in a specific order, it should be apparent that method 200 (and, in some embodiments, the associated method 230 or 260) can include more or fewer operations, which can be executed serially or in parallel. An order of two or more operations may be changed and two or more operations may be combined into a single operation.

FIG. 7 is a block diagram illustrating a server system 700 in accordance with some embodiments. Server system 700, which is an implementation of a server system 104 (FIG. 1), typically includes one or more processing units (CPUs) 702, one or more network or other communications interfaces 706, memory 704, and one or more communication buses 710 for interconnecting these components. The communication buses 710 may include circuitry (sometimes called a chipset) that interconnects and controls communications between system components. Server system 700 optionally may include user interface hardware 708, which may include a display device (not shown), and a keyboard and/or a mouse (not shown). Memory 704 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 704 may optionally include one or more storage devices remotely located from the CPU(s) 702. Memory 704, or alternately non-volatile memory device(s) within memory 704, comprises a non-transitory computer readable storage medium. In some embodiments, memory 704, or the non-transitory computer readable storage medium of memory 704, stores the following programs, modules and data structures, or a subset thereof:

- an operating system 712 that includes procedures for handling various basic system services and for performing hardware dependent tasks;
- a network communication module 714 that is used for connecting the server system 700 to other computers via the one or more network communication interfaces 706 and one or more communication networks (e.g., network 106, FIG. 1), such as the Internet, other wide area networks, local area networks, metropolitan area networks, and so on;
- a email storage system 716;
- an email organization module 724, including an email address identification module 726, an email address weighting module 730, and an email clustering module 734; and
- an email application 740.

The email storage system 716 is an example of storage system 110 (FIG. 1). In some embodiments, the email storage system 716 includes email messages 718 (e.g., the email messages 112-1 through 112-N, FIG. 1, including the email message 300, FIG. 3A, and/or 340, FIG. 3C), cluster listings 720 (e.g., the listing 500, FIG. 5A, and/or 540, FIG. 5C), and mappings of email messages to clusters (e.g., the mapping 520, FIG. 5B, 560, FIG. 5D, and/or 580, FIG. 5E). In some embodiments, the email address identification module 726 stores a set of words 728 (e.g., the set-of-words data structure 320 or 360, FIGS. 3B & 3D). In some embodiments, the email address weighting module 730 implements operation 210 of FIG. 2A, and stores an email address incidence matrix (e.g., the matrix 400 or 420, FIGS. 4A-4B). In some embodiments, the email clustering module 734 implements operation 214 of FIG. 2A, and stores a cluster listing 736 (e.g., the listing 500, FIG. 5A, and/or 540, FIG. 5C) and a mapping of email messages to clusters (e.g., the mapping 520, FIG. 5B, 560, FIG. 5D, and/or 580, FIG. 5E). In some embodiments, the email application 740 includes a UI module 742 (e.g., for generating the UIs 602-A through 602-E, FIGS. 6A-6E, to be sent to a respective client computer) and an email search module 744. In some embodiments, the email organization module 724 and email application 740 together include instructions for performing methods 200 (FIG. 2A), 230 (FIG. 2B), and/or 260 (FIG. 2C).

Each of the above identified elements in FIG. 7 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 704 may store a subset of the modules and data structures identified above. Furthermore, memory 704 may store additional modules and data structures not described above.

Although FIG. 7 shows a "server system," FIG. 7 is intended more as a functional description of the various features which may be present in a set of servers than as a structural schematic of the embodiments described herein. In practice, items shown separately could be combined and some items could be separated. For example, some items shown separately in FIG. 7 could be implemented on single servers and single items could be implemented by one or more servers.

Figure 8:
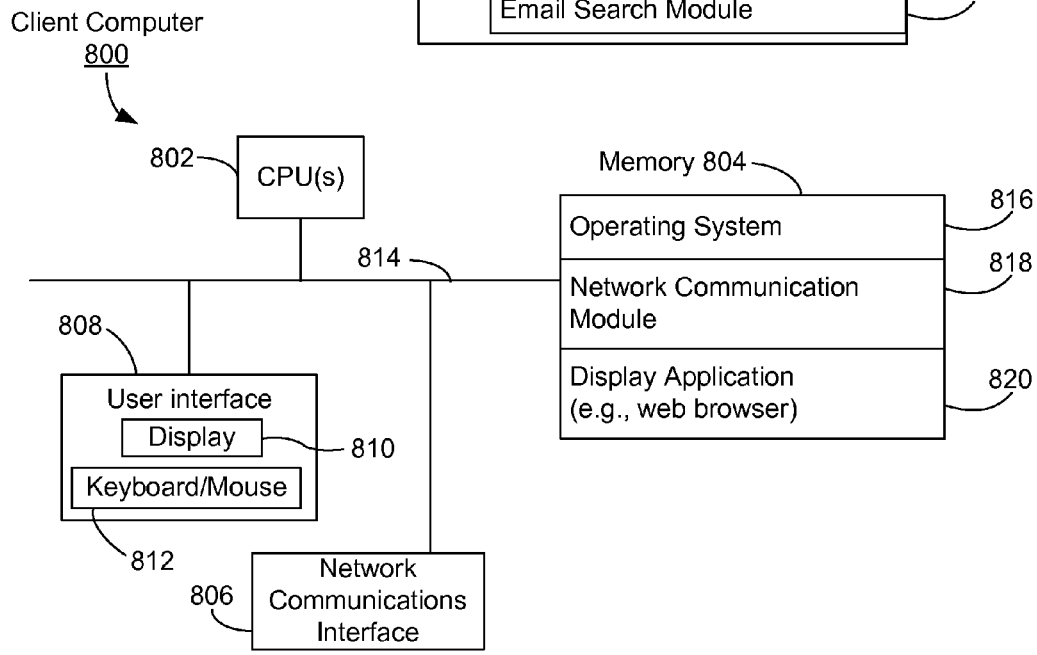
FIG. 8 is a block diagram illustrating a client computer in accordance with some embodiments.

FIG. 8 is a block diagram illustrating a client computer 800 in accordance with some embodiments. Client computer 800, which is an implementation of a client system 102 (FIG. 1), typically includes one or more processing units (CPUs) 802, one or more network or other communications interfaces 806, memory 804, and one or more communication buses 814 for interconnecting these components. The communication buses 814 may include circuitry (sometimes called a chipset) that interconnects and controls communications between system components. Client computer 800 may also include user interface hardware 808 comprising a display device 810 and a keyboard and/or mouse (or other pointing device) 812. Memory 804 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 804 may optionally include one or more storage devices remotely located from the CPU(s) 802. Memory 804, or alternately non-volatile memory device(s) within memory 804, comprises a non-transitory computer readable storage medium. In some embodiments, memory 804, or the non-transitory computer readable storage medium of memory 804, stores the following programs, modules, and data structures, or a subset thereof:

- an operating system 816 that includes procedures for handling various basic system services and for performing hardware dependent tasks;
- a network communication module 818 that is used for connecting client computer 800 to other computers (e.g., server system 700) via the one or more network communication interfaces 806 and one or more communication networks (e.g., the network 106, FIG. 1), such as the Internet, other wide area networks, local area networks, metropolitan area networks, and so on; and
- a display application 820, such as a web browser (e.g., a web browser 600, FIGS. 6A-6E); for example, display application 820 may display email information and user interfaces (e.g., one or more of UI 602-A, 602-B, 602-C, 602-D, and 602-E, examples of which are shown in FIGS. 6A-6E) provided by email application 740 in server system 700.

Each of the above identified elements in FIG. 8 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 804 may store a subset of the modules and data structures identified above. Furthermore, memory 804 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A computer-implemented method of automatically organizing email messages, comprising:
    at a computer system having one or more processors, performing the operations of:
    accessing a plurality of email message headers associated with a plurality of email messages, wherein each email message header comprises a plurality of header fields that specify sender and recipients of the respective email message;
    identifying a set of email addresses included in the email message headers;
    for each email address in the set of email addresses:
    determining whether the respective email address is a group email address or an individual email address; and
    identifying a particular header field containing the email address for each email message header that contains the email address;
    forming an incidence matrix whose first dimension comprises email messages corresponding to the email message headers and whose second dimension comprises email address/header field combinations, wherein each entry in the incidence matrix comprises a respective weight based on an inverse frequency of occurrence of the respective email address/header field combination in the plurality of email messages headers;
    further applying a pair of weighting factors to each entry in the incidence matrix, wherein the first weighting factor of the pair of weighting factors is based on whether the email address is a group email address or an individual email address, and wherein the second weighting factor of the pair of weighting factors is based on the header field containing the email address;
    wherein the first weighting factor comprises a first value for group email addresses and a second value, distinct from the first value, for individual email addresses; and
    wherein the second weighting factor comprises a first weight for a first subset of header fields in the email message headers and a second weight, distinct from the first weight, for a second subset of header fields in the email message headers;
    partitioning the plurality of email messages into a plurality of clusters by applying a clustering algorithm to the incidence matrix; and
    causing email messages of the plurality of email messages to be displayed, organized by the plurality of clusters.

2. The computer-implemented method of claim 1, wherein the email message header fields further comprise one or more of 'bcc' and 'reply-to'.

3. The computer-implemented method of claim 1, wherein the plurality of email message headers is associated with a single user account.

4. The computer-implemented method of claim 1, wherein the plurality of email message headers is associated with a plurality of user accounts.

5. The computer-implemented method of claim 1, further comprising receiving a search query, wherein the plurality of email message headers is accessed in response to the search query.

6. The computer-implemented method of claim 5, wherein the search query is applied to a plurality of user accounts and the plurality of email message headers is associated with the plurality of user accounts.

7. The computer-implemented method of claim 1, wherein causing the email messages of the plurality of email messages to be displayed, organized by the plurality of clusters, comprises:
providing the plurality of clusters for display;
receiving a user input selecting a cluster; and
in response to the user input, providing email messages of the selected cluster for display.

8. The computer-implemented method of claim 7, wherein:
one or more clusters in the plurality of clusters are associated with corresponding subsets of the set of email addresses; and
providing the plurality of clusters for display comprises providing a list of the respective subsets associated with the clusters.

9. The computer-implemented method of claim 1, wherein causing the email messages of the plurality of email messages to be displayed, organized by the respective clusters, comprises:
receiving a search query;
in response to the search query, providing for display clusters determined to be relevant to the search query;
receiving a user input selecting one of the shown clusters; and
in response to the user input, providing for display email messages of the selected cluster.

10. The computer-implemented method of claim 1, wherein:
a first email address of the set is a group email address comprising a first term and a second term;
a second email address of the set is a group email address comprising the first term and a third term; and
partitioning the plurality of email messages into the plurality of clusters comprises treating the first term, the second term, and the third term as separate email addresses.

11. The method of claim 1, wherein causing email messages of the plurality of email messages to be displayed comprises listing out, for a first cluster in the plurality of clusters, (i) an identity of the first cluster, (ii) a numeric indication of the number of email messages in the first cluster, and (iii) one or more email addresses in the first cluster.

12. The method of claim 1, further comprising, prior to forming the incidence matrix, excluding email addresses that occur fewer than a specified number of times in the plurality of email message headers from the identified set of email addresses.

13. A system for automatically organizing email messages, comprising:
one or more processors; and
memory storing one or more programs configured for execution by the one or more processors, the one or more programs comprising:
instructions to access a plurality of email message headers associated with a plurality of email messages, wherein each email message header comprises a plurality of header fields that specify sender and recipients of the respective email message;
instructions to identify a set of email addresses included in the email message headers;
instructions to, for each email address in the set of email addresses:
determine whether the email address is a group email address or an individual email address; and
identify a particular header field containing the email address for each email message header that contains the email address;
instructions to form an incidence matrix whose first dimension comprises email messages corresponding to the email message headers and whose second dimension comprises email address/header field combinations, wherein each entry in the incidence matrix comprises a respective weight based on an inverse frequency of occurrence of the respective email address/header field combination in the plurality of email messages headers;
instructions to further apply a pair of weighting factors to each entry in the incidence matrix, wherein the first weighting factor of the pair of weighting factors is based on whether the email address is a group email address or an individual email address, and wherein the second weighting factor of the pair of weighting factors is based on the identified particular field containing the email address;
wherein the first weighting factor comprises a first value for group email addresses and a second value, distinct from the first value, for individual email addresses; and
wherein the second weighting factor comprises a first weight for a first subset of header fields in the email message headers and a second weight, distinct from the first weight, for a second subset of header fields in the email message headers;
instructions to partition the plurality of email messages into a plurality of clusters by applying a clustering algorithm to the incidence matrix; and
instructions to display email messages of the plurality of email messages, organized by the plurality of clusters.

14. A non-transitory computer readable storage medium storing one or more programs configured to be executed by a computer system to organize email messages automatically, the one or more programs comprising:
instructions to access a plurality of email message headers associated with a plurality of email messages, wherein each email message header comprises a plurality of header fields that specify sender and recipients of the respective email message;
instructions to identify a set of email addresses included in the email message headers;
instructions to, for each email address in the set of email addresses:
determine whether the email address is a group email address or an individual email address; and
identify a particular header field containing the email address for each email message header that contains the email address;
instructions to form an incidence matrix whose first dimension comprises email messages corresponding to the email message headers and whose second dimension comprises email address/header field combinations, wherein each entry in the incidence matrix comprises a respective weight based on an inverse frequency of occurrence of the respective email address/header field combination in the plurality of email messages headers;
instructions to further apply a pair of weighting factors to each entry in the incidence matrix, wherein the first weighting factor of the pair of weighting factors is based on whether the email address is a group email address or an individual email address, and wherein the second weighting factor of the pair of weighting factors is based on the identified particular field containing the email address;

wherein the first weighting factor comprises a first value for group email addresses and a second value, distinct from the first value, for individual email addresses; and wherein the second weighting factor comprises a first weight for a first subset of header fields in the email message headers and a second weight, distinct from the first weight, for a second subset of header fields in the email message headers;

instructions to partition the plurality of email messages into a plurality of clusters by applying a clustering algorithm to the incidence matrix; and instructions to display provide email messages of the plurality of email messages, organized by the plurality of clusters.

* * * * *